United States Patent [19]
Kubec et al.

[11] 3,784,361
[45] Jan. 8, 1974

[54] CONVERTER FOR HIGH PRESSURE SYNTHESIS

[75] Inventors: Jiri Kubec, Hlavni; Vladimir Saroch, Brno, both of Czechoslovakia

[73] Assignee: Kralonopolska Strojirna narodni Podnik, Brno, Czechoslovakia

[22] Filed: June 24, 1971

[21] Appl. No.: 156,310

Related U.S. Application Data

[63] Continuation-in-part of Ser. No. 31,124, April 23, 1970, abandoned.

[30] Foreign Application Priority Data
Apr. 23, 1969 Czechoslovakia .................. 2887/69

[52] U.S. Cl................ 23/289, 23/288 H, 23/288 K
[51] Int. Cl.............................................. B01j 9/04
[58] Field of Search............. 23/289, 288 R, 288 H, 23/284 US, 199, 198, 176, 288 K; 423/352, 360, 361, 362

[56] References Cited
UNITED STATES PATENTS

| | | |
|---|---|---|
| 3,475,136 | 10/1969 | Eschenbrenner et al............ 23/289 |
| 3,041,151 | 6/1962 | Christensen .......................... 23/289 |
| 3,366,461 | 1/1968 | Christensen .......................... 23/289 |
| 3,477,828 | 11/1969 | Schulze et al......................... 23/289 |
| 1,987,903 | 1/1935 | Houdry .............................. 23/288 R |
| 3,227,528 | 1/1966 | Jaeger................................... 23/289 |
| 3,235,344 | 2/1966 | Dreyer et al.......................... 23/289 |

*Primary Examiner*—Joseph Scovronek
*Attorney*—Richard Low et al.

[57] ABSTRACT

A converter for high-pressure synthesis of ammonia or methanol having an upright outer pressure shell consisting of a cylindrical middle body and two hemisphere-like heads, a thin walled conforming liner in the shell, an upright conduit axially centered in the shell which extends along the whole length of the cylindrical middle body, from a built in grating in the lower hemisphere like head close to a manhole atop the upper head, the manhole being just large enough for insertion of the conduit therethrough. A body of particulate catalyst material fills the annular space between the liner and the conduit and extends from the grating almost to the top end of the conduit. Cooling means are axially spaced through the bed. An electric heater and a shell and tube heat exchanger are arranged one above the other in the conduit, both adapted for preheating of the main portion of the gaseous reactants before the reactants enter the catalyst body. The remainder of the reactants is injected into the catalyst body through the cooling means which comprise at least one system of gas permeable coffers extending radially over the entire flow section of the catalyst bed.

12 Claims, 5 Drawing Figures

PATENTED JAN 8 1974 3,784,361

JIRI KUBEC
VLADIMIR SAROCH
INVENTORS

BY
ATTORNEY

JIRI KUBEC
VLADIMIR SAROCH
INVENTORS

ATTORNEY

CONVERTER FOR HIGH PRESSURE SYNTHESIS

The present application is a continuation in part of copending application by the same inventors filed Apr. 23, 1970, under Ser. No. 31,124 now abandoned.

BACKGROUND OF THE INVENTION

This invention relates to converter for exothermic high pressure synthesis, and particularly to a converter suitable for the catalytic synthesis of ammonia or methanol from a gaseous mixture at a production rate of 1,000 tons per day or more.

In the present converter, the exothermic catalytic synthesis is carried out in a continuous catalyst bed, cooled in a direct manner, by mixing the reaction mixture with fresh gaseous reactants injected into the catalytic bed.

In most classical cylindrical converters, the catalyst section is generally split into a number of separate catalyst beds spaced one above the other. Between the catalyst beds, either indirect heat exchange or direct quenching of the treated gas mixture is accomplished in order to remove reaction heat from the reaction zone. Both quenching and indirect heat exchange are carried out by means of built in cooling floors or cooling means. Conventional cooling means or cooling floors have very complicated designs and are difficult to assemble. Due to these facts, the converter body must be provided with a full diameter assembly manhole. When fresh catalyst is to be charged, or spent catalyst is to be replaced, or the built in equipment is to be repaired, the cooling means or floors have to be disassembled and removed from the converter body stage by stage. This lack of accessibility to the built in parts represents a considerable drawback in conventional converter types since the aforementioned parts are susceptible to nitridation and metallic deposition, which require periodic removal.

In addition, the conventional mixing floors that have been used for direct quenching do not provide uniform distribution of the cold gaseous reactants in the catalyst section. The insufficient cooling effect takes place close to the inner wall of the protective liner bounding the catalyst section threatening the destruction of the wall and creates severe catalyst overheating. On the other hand, in those areas where more effective cooling is exerted, the catalyzing effect decreases significantly.

Experience has taught that conventional converters cannot be easily scaled up to large productive capacity.

Efforts have been made in scaling up conventional cylindrical converters by multiplying their dimensions. With the increasing diameter of the converter, however, the diameter of the assembly manhole and that of the high-pressure cover closing the same have to be increased accordingly. At the same time, higher requirements are made on the mechanical resistance and rigidity of the cover because of the high reaction pressure exerted thereon. Thus it has been proven that there are limits set to the diameter of the converter. Outside these limits, the manufacture and the assembly of the high-pressure converter cannot be realized. The same holds true even for the high-pressure converter shell that is to carry the heavy cover.

Serious difficulties have been encountered even in those cases where an increase of converter capacity was achieved on account of the expansion of the height of the converter body. The built-in cooling means alternating with the high catalyst columns caused considerable pressure drop of the synthesis mixture flowing therethrough. In addition, the mounting and dismounting work within the dusty internal space of a taller converter is very difficult, lengthy and unhealthy.

The primary object of this invention is to provide an efficient and economical high-pressure converter in which the advantageous features both of spherical and cylindrical converter designs is combined and which is adapted to be built at practical costs in unit sizes even larger than were possible heretofore.

It has been proven, for example, that spherical converters, as used in petrochemistry, exhibit excellent qualities in regard to the pressure resistance and thermal dilatation. Uniform catalyst spending and reaction heat removal, however, hardly can be achieved therein. The classical cylindrical converter, on the other hand, is able to meet the latter demands in a satisfactory way.

Another object of the invention is to provide a cooling floor assembly which is characterized by its extreme simplicity and by the fact that it is built-up from a plurality of equal, uniform, and comparatively small segments. The floor lay-out, in accordance with the invention, permits the segments to be economically produced, easily assembled in a converter body and easily maintained therein, as well as easily replaced or removed therefrom.

Another object of this invention is to provide a floor assembly which allows catalyst to be charged freely without dismounting of the floor in order to form a continuous catalyst body or to drain the catalyst without dismounting of the floor.

A still further object of the invention is to provide built-in equipment, all the parts of which are easily accessible and replaceable, respectively, so that this equipment allows the assembly manhole to be made with a considerably restricted diameter.

A still further object of the invention is to provide a cooling floor assembly that results in uniform distribution of cold incoming gaseous reactants in the catalyst section of the converter for the sake of quenching the same.

Additional objects of the invention will be apparent from the following description which is to be taken in conjunction with the accompanying drawings.

BRIEF DESCRIPTION OF THE DRAWINGS

Other features and many of the attendant advantages of the invention will readily be appreciated as the same becomes better understood by reference to the following detailed description of the preferred embodiments, when considered in connection with the drawings in which.

DESCRIPTION OF THE INVENTION

Figure 1:
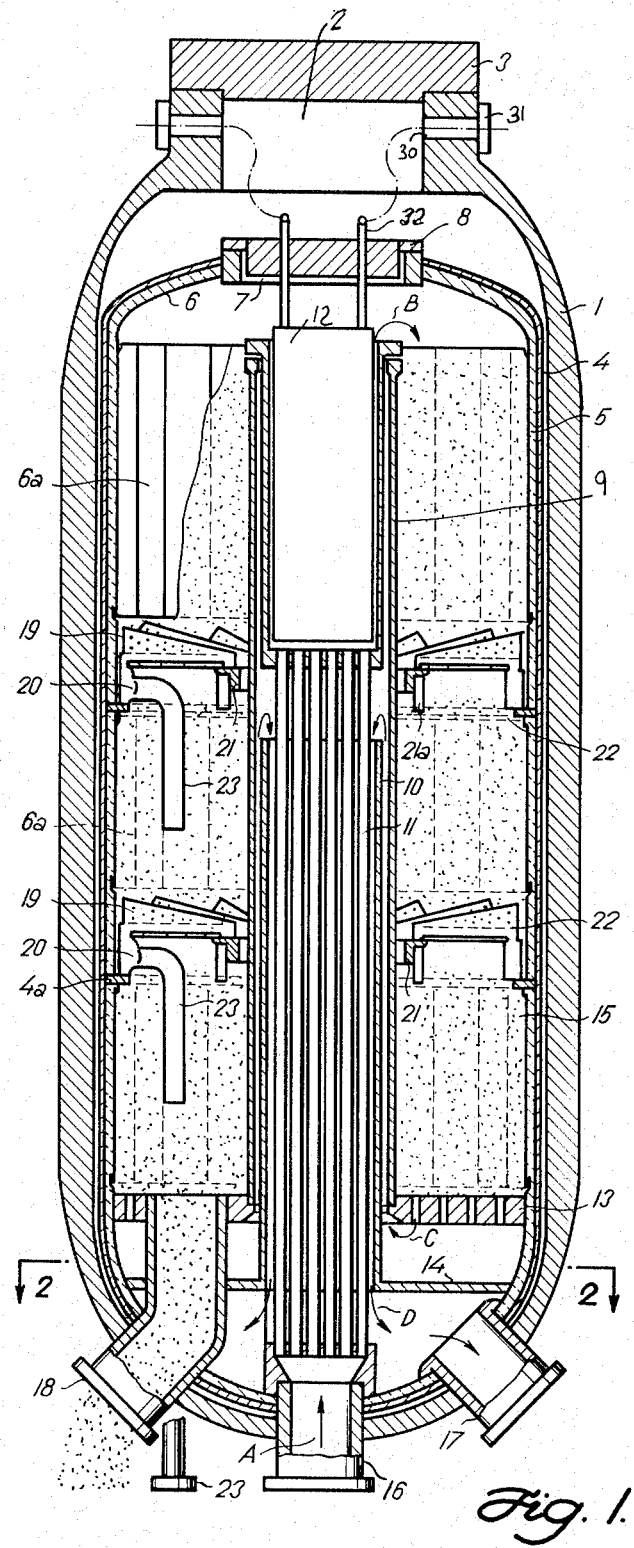
FIG. 1 shows a vertical axial section of the converter.

Referring now to the drawings in greater detail, and initially to FIG. 1, there is shown as much of a high-pressure converter as it is necessary for understanding the invention.

Figure 4:
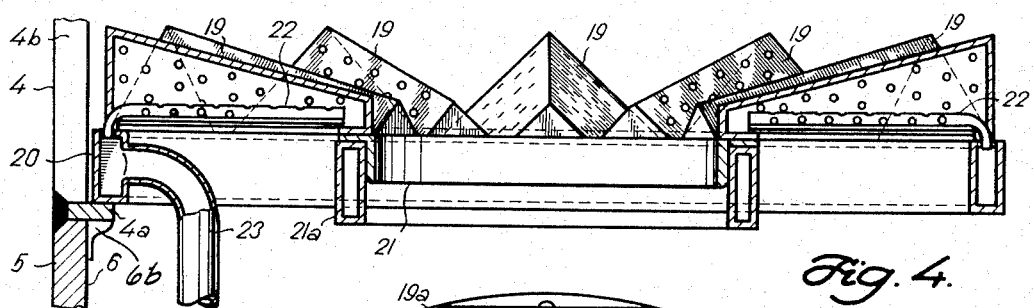
FIG. 4 shows a vertical axial section of the detailed arrangement of the cooling floor taken along line 4—4 of FIG. 3.

The ammonia or methanol synthesis converter as illustrated in the drawing is an upright pressure vessel consisting essentially of a cylindrical middle body and two hemisphere like heads. The outer pressure shell 1 of the converter is a unitary, welded, heavy steel body. Its inner wall is lined with a low-pressure, conforming metal liner 4. The liner carries on its inner face a coating 5 of asbestos or similar thermally resistant material which is chemically inert to the reactants and to the catalyst employed under the prevailing reaction condition. The coating 5 is, moreover, provided with a protective, thin-walled casing 6 on its inner face. The casing 6 comprises a plurality of annular built-up assemblies formed from a plurality of separate dismountable sections or sheets 6a fixed to the liner 4. The sections 6a are vertical, generally rectangular members having an arcuate face or cross section, which are interlocked with each other. For this reason, wedge-like or hook-like means 6b (See FIG. 4) are provided on upper and lower edges of the casing sections 6, which coact with lugs or clips 4a spaced on the liner 4 and extending radially inward. As a matter of fact, the liner 4 bears the entire built-in equipment. For the sake of centering the liner within the converter and spacing it from the shell 1, radial ribs (not shown) are provided on the bottom of the latter. It is possible, although not essential to eliminate the asbestos coating in the annular portion between the lower edge of one assembly of sections 6 and the upper edge of the next adjacent assembly.

All of the openings into and out of the converter for the reactant gas, liquid and materials are located in the lower hemisphere-like head, i.e., in the bottom portion of the pressure shell 1, below the bottommost liner assembly. These openings will be described more fully hereinbelow.

Atop the upper hemisphere-like head, there is provided a manhole 2 through which the interior parts may be assembled and through which catalyst may be inserted. The manhole is normally closed by a flat high-pressure cover 3, heavy enough to withstand the operating pressure. The high-pressure cover 3 is held in place by conventional closure elements and sealed by conventional sealing means, such as by double-cone sealing. Both the closure elements and sealing means are not illustrated in the drawing. Neither technological openings for reactants, fluid etc., bushings or electrical conductors are provided in cover 3. Heat electrodes 32, are connected to a power source outside the converter body through conduits 30 located in insulated members 31 passing through the wall of the manhole below the cover 3, as represented by a broken line.

A relatively light inner cover 8 similarly closes an assembly opening 7 in the liner 4 as well as in the protective casing 6. The opening 7 is aligned with the manhole 2 and, in the main, coincident therewith.

A cylindrical conduit 9 extends coaxially in the cavity within the liner 4 from a horizontal grating 13 spaced above the lower head near the dished converter bottom to a position almost to the inner cover 8. The annular space radially bounded by the low-pressure liner 4 and the conduit 9 is filled with a bed 15 of particulate catalyst material which forms a continuous body axially extending from the grating 13 to the top of the conduit 9, i.e., along the whole length of the cylindrical middle body of the converter.

The lower portion of the conduit 9 holds a heat exchanger 11 whereas the top portion thereof has an electrical heater assembly 12 disposed therein connected via conduits 30 to a source of power. A horizontal partition or wall 14 divides the space under the grating 13 in the lower head into two chambers, sealed from each other in a fluid tight manner. The shell 10 of the heat exchanger 11 is radially spaced from the enveloping conduit 9 and projects downwardly beyond the conduit 9 and the grating 13 to a sealed connection with the partition 14, defining an axial passage in the same. In a similar fluid tight manner the conduit 9 is attached to the grating 13.

Several tubular chutes 18, of which only one is shown in the drawings, lead downwardly and outwardly from the grating 13 through the partition wall 14 and through the shell 1. The chutes 18 are normally capped and permit the catalyst to be drained under gravity or suction from the converter body if open. The tube nozzle 16 of the heat exchanger 11 passes axially outward from the lower hemispherelike segment of the converter and provides the principal inlet for the synthesis mixture. At least one discharge nipple 17 leads further from the chamber under the partition wall 14 outwardly through the shell 1.

Figure 3:
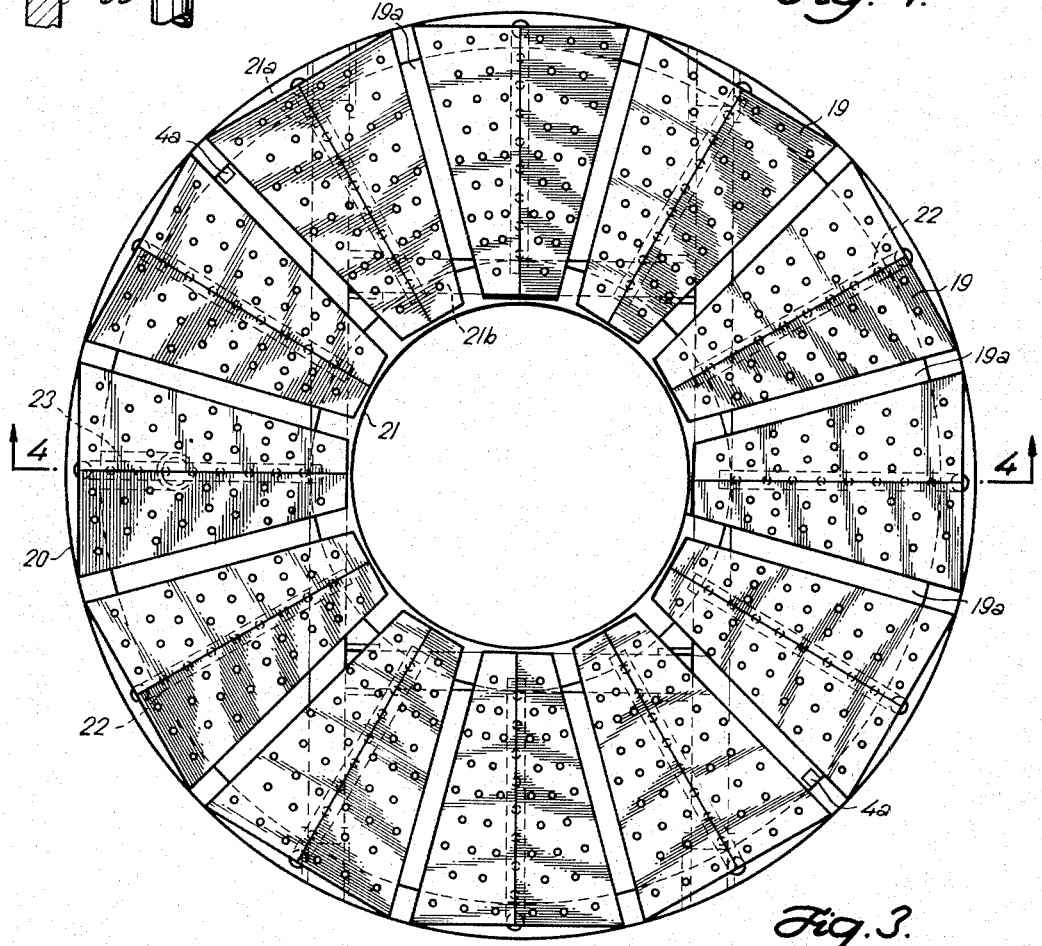
FIG. 3 shows a plan view of the cooling floor.

Two removable cooling floors are arranged within the continuous catalyst bed 15 each generally along a plane perpendicular to the central axis of the shell. The floors are located axially between each of the assemblies of liner sections 6 and both of them overbridge the entire flow section of the catalyst bed 15. The design of the cooling floors is illustrated in greater details in FIGS. 3, 4, and 5. Each floor consists of a plurality of separate coffers 19 mutually spaced from one another. Between the coffers 19 are radial gaps 19a to permit catalyst to drop freely down from one assembly of liner sections to another. The coffers 19 have a roof like or saddle like shaping with the sharp edge directed upwardly, towards the assembly opening 7 and towards the manhole 2 through which the fresh catalyst is supplied. The described form of the coffers insures that the catalyst drops down through the cooling floors with a minimum of obstruction. Beside the roof like or saddle like shape other profiles can be used for the coffers, too. They can for example be hollow truncated cones. Moreover, it is not necessary for the coffers of a cooling floor to be arranged in a single horizontal level only. They can be grouped in a staggered relationship, as well, and different shapes can be used at different levels.

The coffers 19 are supported by two bearing rings 20 and 21 that are both attached to the low-pressure liner 4; the outer ring 20 rests directly on lugs 4a while the ring 21 is supported in an indirect manner by diagonal beams 21a and 21b fixed by their outer ends to ledge 4a of the liner 4. Thus, there are no supporting elements fixed to the cylindrical inner conduit 9 and the cooling floors can be regarded as selfbearing ones, or at least as cantilevered from the liner wall 4.

Figure 2:
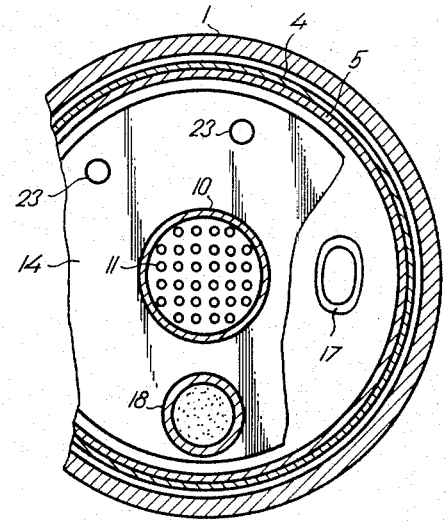
FIG. 2 is a sectional view taken along line 2—2 of FIG. 1.

At least one supply tube 23 for cold gaseous reactants opens into the outer bearing ring 20 so that ring 20 fulfills the function of a distributing element. In a similar way, the inner ring 21 carries out this function, as well. On the other hand, if desirable, both rings 20 and 21 can be constructed to function as distributing elements, if necessary. Generally, however, it is sufficient if only one of the rings is employed as a distributor. The supply tubes 23 lead through the catalyst body and exchange heat therewith, and then lead through the bottom part outwardly of the high pressure shell 1 to a source of cooling gaseous media. From the outer ring 20 the cold gaseous mixture is distributed into perforated tube jets 22 extending radially towards the wall of the conduit 9, into and over the entire flow section of the catalyst body. As seen in FIG. 2 the tubes 23 are staggered about the central axis of the converter so as not to overlap each other.

Figure 5:
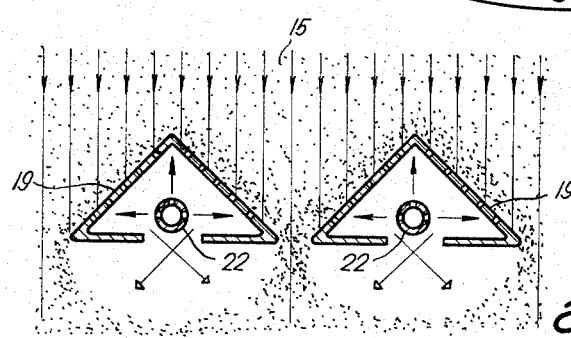
FIG. 5 shows a schematic representation of the flow of the gaseous reactants through two of the gas permeable coffers defining the cooling floor according to FIGS. 2 and 3, in vertical axial section.

As illustrated in FIG. 5, the upper side portions of the coffers 19 are made gas permeable. In general, all the top and side portions of the coffers which are facing the descending stream of gaseous reaction mixture and which show a deflection from the vertical axis exceeding 10° are preferably made of gas-permeable sheet materials like perforated plates, sieves, grates etc. The underside of the coffers, on the other hand, and all the side portions that show a deflection from the vertical axis lesser than 10° are made impermeable with the exception of a single longitudinal opening on the underside of the coffer, this opening being situated beneath the tube nozzle 22 and aligned therewith. The gas impermeable side and underside portions give strength and sufficient rigidity to the coffers and at the same time cooperate in defining a mixing chamber therein, as well as acting to deflect the quenched gaseous mixture flowing therefrom.

It will be obvious that the catalyst particles generally must be sufficiently large so that they will not pass through the gas permeable openings in the coffer 19 if the openings are not covered. On the other hand the openings in the coffers to make them gas permeable can also be equipped with wire mesh grids or the like in order to prevent drainage of a catalyst having a particle size small enough to pass through the opening. In any event, however, the catalyst particles should never be so large that they cannot pass through the gaps 19a between the coffers 19 in order to facilitate removal and resupply of catalyst when desirable.

The afore described converter is operated as follows in the synthesis of ammonia from a gas mixture essentially consisting of nitrogen and hydrogen.

The gas mixture, suitably preheated and compressed enters the pressure vessel of the converter through the tubular nozzle 16 of the heat exchanger 11 indicated by the arrow A. It flows upwardly through the tubes of the heat exchanger into the heater assembly 12 where it is brought up to reaction temperature during a start up period. The heated gas mixture leaving the heater assembly as seen by arrow B, passes downwardly through the catalyst bed 15 which may be formed of granular iron oxides and then through the gas permeable grating 13 into the chamber above the partition wall 14. From here, the mixture as seen by arrow C, ascends upwardly through the annular space between the wall of the conduit 9 and the heat exchanger shell 10 to the top of the latter, wherefrom it descends through the channel defined by the shell 10 in heat exchanging contact with the heat exchanger tubes in which the reactant mixture flows upwardly, thence following arrow D into the collecting chamber beneath the partition wall 14. The resulting synthesized gas mixture, has thus transferred a part of its thermal energy to the fresh mixture entering the reaction zone, leaves the high pressure converter shell 1 through the discharge nipple or nipples 17 for further recovery of the remainder of its thermal energy in any desired manner.

The reaction of hydrogen with nitrogen is exothermic, and the temperature of the catalyst bed 15 is controlled by injecting a mixture of the other gaseous reactants used for the synthesis at ambient or other relatively low temperature through the tube jets 22 into the mixing chambers of the coffers 19. In the mixing chambers, an abundant mixing and quenching effect can be achieved under the turbulent movement of both contacting gaseous streams. The narrow, reduced discharge orifice on the underside of the coffer, as well as the catalyst free space under the same, contribute to the uniform distribution of the resulting quenched mixture into the catalyst layer beneath. In a similar way, the radial grouping of the coffers into the full section floors aids in the uniform releasing of the reaction mixture mixed with the freshly introduced reactants over the entire flow section of the catalyst bed. In addition, owing to the convenient cooling assembly design, pressure losses can demonstrably be reduced. As a matter of fact, the present cooling floors can be regarded as dividing the continuous catalyst bed in a space and pressure saving manner into three separate technological layers.

After a steady state is reached, the heater assembly 12 is no longer needed and may be deenergized.

When the catalyst is spent and needs to be replaced, it is drained from the chutes 18 without requiring an operator to enter the pressure vessel. Fresh catalyst may be supplied through the manhole 2 and the assembly opening 7. The coffers 19 do not obstruct the catalyst from falling loosely down through the floors by way of radial gaps and to create a continuous catalyst body. The same holds true even for the draining off the catalyst which is as easy as the catalyst filling.

As mentioned above, the shaping and the size of the coffers may vary widely, in accordance with the requirements on the mechanical resistance and functional capacity thereof, as well as on the through-put capacity of the converter.

The present invention presents many advantages. For example the cooling floors formed by the coffers are of like shape and equal size so that they may be manufactured in an economic way. At the same time, the maintenance and repair of the floors is made much easier since worn coffers can be replaced by new ones very quickly and with minimum effort. In addition, since the cooling floors are easily disassembled and removed, all the built in parts including the protective metal casing 6 and the coating 5 become easily accessible.

A further advantage and interesting characteristic of the present converter design is a comparatively small assembly manhole in the upper hemisphere like head. This manhole enables the mounting and dismounting, as well as the removing of nearly all built in parts. Consequently, a condition for the realization of large units has been fulfilled.

What is claimed

1. A converter for high pressure synthesis comprising a vertically arranged pressure resistant elongated cylindrical body having a liner inert to reactants of said synthesis and enclosed at both ends to form a reaction shell within said body, a transverse partition located within said shell adjacent the lower end, a support grating arranged above and spaced from said partition, a tubular conduit supported on said grating and extending upward along a portion of the length of said shell forming therewith an axial annular chamber open at its upper end, a catalyst bed located in said chamber, and at least one means for delivering a cooling media to said catalyst bed, a heat exchanger extending into said conduit, said heat exchanger comprising a sleeve mounted on said partition and a plurality of spaced tubes extending therethrough, inlet means connected to said tubes for the introduction of material to be synthesized, said sleeve forming with said conduit a channel communicating with the space between said grating and said partition for the flow of synthesized material from said annular chamber, a collecting chamber below said heat exchanger sleeve and outlet means extending through said shell communicating with collecting chamber for the discharge of synthesized material therefrom whereby the flow of material to be synthesized proceeds from said inlet through said tubes into said annular chamber, through said catalyst bed, the exiting synthesized material flowing through said sleeve in contact with said tubes.

2. The converter as set forth in claim 1, wherein said means for delivering said cooling media comprises at least one annular member arranged axially within said shell to divide said annular chamber and to provide a floor for supporting the catalyst lying above it, at least one said member being permeable to gas flow and providing means for allowing said catalyst to pass from one end of said shell to the other.

3. The converter according to claim 1 including a heater interposed within said conduit in axial alignment with said heat exchanger between said heat exchanger and said annular chamber, the tubes of said heat exchanger opening into said heater, said heater forming a conduit channel for passing said material to be synthesized into said annular chamber, and for providing extra heat to said material to be synthesized.

4. The converter according to claim 3, wherein said heater is an electric heater.

5. The converter as set forth in claim 1 wherein the liner has a heat resistant coating on its inner surface and a thin walled casing conforming to the inner surface of said liner and said casing disposed over said coating, and consisting of a plurality of sheet elements adapted to be dismounted and removed separately.

6. The converter as set forth in claim 2 wherein at least one said annular catalyst support member comprises a plurality of elements extending radially with respect to the conduit and spaced from each other over substantially the entire cross section of said annular chamber, outer and inner bearing rings supporting said elements, said outer bearing ring located adjacent the inner wall of the casing, said inner bearing ring adjoining the exterior wall of said conduit, said outer bearing ring being removably supported on support means carried by the liner, at least one of said support rings being hollow and adapted to receive and distribute gaseous reactants to said catalyst bed and a supply tube terminating in said one hollow ring connected to a source of cooled reactant.

7. The converter as set forth in claim 6 wherein each of said elements are removably secured to said bearing rings.

8. The converter as set forth in claim 2 wherein each of elements have a bent upper portion and flat lower portions defining a hollow space therebetween wherein said cooled reactants may mix with the material to be synthesized.

9. The converter as set forth in claim 8 wherein each element includes a perforated tube connected to said hollow ring and projecting radially into the hollow space of said elements.

10. In a converter for high pressure synthesis having a pressure resistant elongated cylindrical shell enclosed at both ends, a support grating located within said cylindrical shell adjacent one end, a conduit of substantially uniform cross section axially located in said shell and extending from said grating along a portion of the length of said cylindrical shell to form a continuous annular chamber with said shell, a catalyst provided in said chamber and supported by said grating, and means for feeding material to be synthesized through said conduit into said annular chamber and means for withdrawing the synthesized material from said annular chamber through said grating, and means for delivering a stream of reactant media to said catalyst, the improvement comprising means for supporting said catalyst comprising an annulus having an inner diameter substantially equal to the outer diameter of said conduit and an outer diameter substantially equal to the inner diameter of said wall, said support means being arranged substantially in a plane transverse to the axis of the conduit and spaced from said grating to form a floor for the portion of said catalyst lying above it, and means for delivering a cooling reactant media to said supporting means, said supporting means being perforated to be permeable to the material to be synthesized and provided with openings to permit flow of cooling reactant media therethrough into said catalyst.

11. The converter according to claim 10 wherein said catalyst supporting means comprises a hollow tubular bearing ring connected to a source of reactant, said ring being secured to the inner wall of said shell and a plurality of perforated panels secured to said ring and extending radially inward toward said conduit, each of said panels having a slanted upper surface for supporting said catalyst and a bottom surface spaced therefrom to form a hollow interior space within each panel, said panels being spaced from each other circularly about said conduit, and having a perforated tube extending from said bearing ring along the radial length of said panel to discharge said reactant into said catalyst.

12. The converter according to claim 11, including an inner bearing ring for supporting the panels on said conduit, said inner bearing ring being hollow and perforated along its periphery and being connected to each of said radial perforated tubes extending from said bearing ring secured to the inner wall.

* * * * *